United States Patent [19]
Fischer

[11] 3,822,843
[45] July 9, 1974

[54] APPARATUS FOR STRIPPING FILM FROM A REEL
[75] Inventor: Joerg Fischer, Wilmette, Ill.
[73] Assignee: Bell & Howell Company, Chicago, Ill.
[22] Filed: Nov. 1, 1972
[21] Appl. No.: 302,683

[52] U.S. Cl. .................................. 242/192, 226/91
[51] Int. Cl...... G03b 1/56, G03b 1/04, G11b 15/32
[58] Field of Search............ 242/192, 195, 206–210; 352/72, 78, 157, 158; 226/91, 92

[56] References Cited
UNITED STATES PATENTS
3,730,454  5/1973  Brown................................ 242/192
3,733,036  5/1973  Eitzenberger...................... 242/192

Primary Examiner—Leonard D. Christian
Attorney, Agent, or Firm—Roger M. Fitz-Gerald; John E. Peele, Jr.; Leon B. Waguespack

[57] ABSTRACT

An apparatus for stripping the leader from a roll of film. A stripper arm is pivotally supported at one end and biased toward the film. The free end of the arm carries a pivotally supported crescent shaped stripper tip defining a leading edge, a trailing edge and a stripping surface. As a result of the shape of the tip, both the leading and trailing edges rest upon the outer surface of the coiled film assuring a constant angle between the stripping surface and the film regardless of the shape of the outer film convolution.

10 Claims, 3 Drawing Figures

PATENTED JUL 9 1974  3,822,843

APPARATUS FOR STRIPPING FILM FROM A REEL

BACKGROUND OF THE INVENTION

This invention generally relates to an apparatus for stripping a leader from a reel of film and more particularly relates to such a stripping device which includes means for adapting to the non-uniform outer contour of a clocksprung reel of film.

A continuing theme in the development of motion picture projectors has been the reduction of manual manipulations of the film by the user. A particular convenience found on present day motion picture projectors is the automatic threading feature. A common approach requires the operator to place the film reel on the projector and grasp the leader. The leader is then manually positioned into a threading mechanism from which point it is automatically threaded through the projector. A recent development in this area has been with respect to cassette film reels. In this regard, a reel of film is retained within a cartridge which is then mounted upon the projector. Certain projectors permit the stacking of several cassettes which are automatically projected in sequence.

With respect to such fully automatic projectors, the film leader is stripped from the reel by automatic means and then processed through the projector. It will be appreciated that the film upon the reel retained in the cartridge is in roll form and unless placed under tension will exhibit a clockspring effect causing the reel to partially unwind within the cartridge. The extent to which the clockspring effect occurs is dependent upon the resiliency of the film material and the quantity of film upon the reel. That is, the amount of excess space between the inner wall of the cartridge and the film when in a tightly coiled configuration. When the film clocksprings, the shape of the outer convolutions are generally not circular but may be oval or attain some other shape determined by the contour of the inner wall of the cartridge and the frictional coefficient between the film and the inner surface of the reel flanges. This deformation in the outer convolutions of the film in its clockspring or loosely wound condition introduces certain problems when the film is automatically stripped from the reel.

In such projectors, the stripping process is usually accomplished by means of a wedged shaped stripper which rides upon the outer surface of the film stripping the end of the leader from the film roll. To accomplish this function, the stripping surface of the stripper should ride along the film at a predetermined angle with respect to the film. In the clockspring condition, this approach angle is difficult to maintain and as a result malfunction is a frequent occurrence with previously known automatic projectors.

A main object of this invention is to provide an improved apparatus for stripping a film leader from a reel of film which adjusts to irregular contours in the outer convolutions of the film.

Other objects and advantages of this invention will become obvious from the following description of a preferred embodiment when considered in conjunction with the accompanying drawings.

DESCRIPTION OF THE ILLUSTRATED EMBODIMENT

Figure 1:
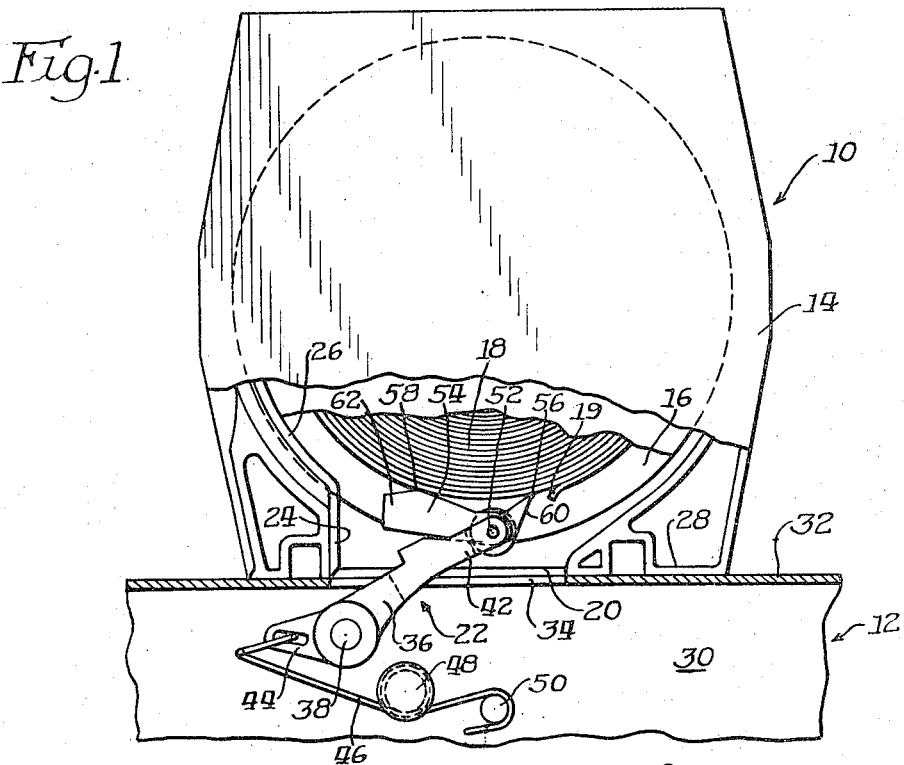
FIG. 1 is a plan view of a film cartridge in cooperation with a projector including certain features of the invention with the cartridge sectionally and the projector fragmentarily illustrated.

With particular reference to FIG. 1, the apparatus includes a film cassette 10 mounted upon and in cooperation with a film projector 12. Only that portion of the projector 12 is shown which is necessary to provide a description of the illustrated embodiment. Briefly, the film cassette 10 comprises a hollow cartridge 14 adapted for receiving a film reel 16 upon which is wound a coiled web of material which in the illustrated embodiment is developed motion picture film 18 having a leader 19. The base of the cartridge is opened as at 20 to allow a stripper assembly 22 to enter the cartridge 14 and engage with the film 18 upon the reel 16. The cartridge 14 further defines an inner wall having a vertically directed portion 24 the plane of which is normal to the projector 12 and a curved inner portion 26. An outer lower wall 28 of the cartridge 14 is suitably shaped for reception by and alignment with the projector 12. The projector 12 is fragmentarily illustrated and comprises a rear wall 30 and an upper wall 32 defining an opening 34. The cartridge 14 is seated upon the outer surface of the upper wall 32 so that the opening 20 is in alignment with the opening 34 in the cartridge 14 thereby facilitating entrance into the cassette 10 of the stripper assembly 22.

Figure 2:
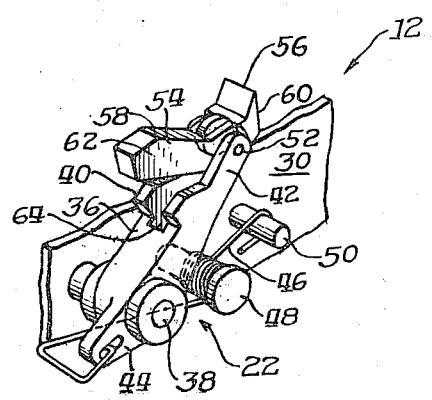
FIG. 2 is a perspective view of a portion of the apparatus shown in FIG. 1 more clearly illustrating certain features of a component thereof.

With particular reference to FIG. 2, the stripper assembly 22 comprises an elongated stripper arm 36 pivotally supported upon a stripper arm pivot bearing 38 which is mounted to the rear wall 30 of the projector 12. The stripper arm pivot bearing 38 is positioned so that the free end of the stripper arm can be positioned into the cartridge 14 through the opening 34 defined by the upper wall of the projector 12 and the cartridge opening 20 for engagement with the film 18. The free end of the stripper arm 36 is bifurcated defining two support prongs 40 and 42. Formed with the stripper arm 36 and located adjacent the bearing 38 is a spring retention lug 44. The spring retention lug 44 is slotted for receiving a stripper arm torsion spring 46. Serving to support the coiled portion of the torsion spring 46 is a spring support rod 48 which is mounted to the rear wall 30 of the projector 12. One end of the torsion spring 46 is hooked to engage the slot defined by the spring retention lug 44 and the remaining end of the spring 46 is looped about a spring retention pin 50 projecting from the rear wall 30 of the projector 12. The stripper arm torsion spring 46 is positioned to bias the stripper arm 36 in a counter-clockwise direction as viewed in FIG. 1 thereby forcing the free end of the stripper arm 36 into the film cassette 10.

Pivotally supported by a pin 52 passing through the prongs 40 and 42 is a stripper tip 54. The stripper tip 54 is generally crescent shaped defining a leading edge 56 as well as a trailing edge 58. The leading edge 56 is wedge shaped and defines a forward stripping surface 60. The support pin 52 passes freely through the tip 54 thereby facilitating a rocking motion. Additionally, the stripper tip 54 includes a deflection member 62 which extends outwardly from the trailing edge 58 of the stripper tip 54 and serves to prevent improper feed of the film 18 about the reel 16 in a manner which will hereinafter be more thoroughly described. As illustrated, a notch 64 defined by the bifurcated end of the stripper arm 36 permits only restricted rotational movement of the tip 54 since complete circular rotation is limited by the deflection member 62 of the tip 54 hitting the stripper arm. The center of gravity of the tip 54 is between the deflection member 62 and the support pin 52; thus, when the tip is not in engagement with the film 18, gravitational force will bias the deflector member 62 causing it to rest in the crook 64 between the prongs 40 and 42.

In use, the loaded film cassette 10 is placed upon the projector 12 so that the opening 34 in the upper wall of the projector is in alignment with the opening 20 in the base of the cartridge 14. Under bias of the torsion spring 46 the stripper arm 36 is urged into the cartridge 14 so as to force the stripper tip 54 against the film 18. It will be appreciated that the stripper tip 54 will rock about its pivot point until both the leading 56 and trailing 58 edges are in contact with the outer convolution of the film 18. In this position, the stripping surface 60 of the leading edge 56 forms a predetermined angle with the outer convolution of the film 18 which is selected to assure proper stripping of the film leader 19. This angle has been experimentally determined to assure that the film leader 19 will be stripped from the reel 16 as the reel 16 is rotated within the cartridge 14. It has been found that an acute angle with a range of 30° to 40° between the tip surface 60 and a tangent to the film 18 at the point of contact with the leading edge 56 is satisfactory.

As illustrated in FIG. 1, the film 18 is shown tightly wound about the reel 16 with the outer film convolution circular in shape. Under bias of the torsion spring 46, the stripper tip 54 is forced against the film 18 and as a result of the limited swivel action of the tip 54, both the leading 56 and trailing 58 edges ride upon the film 18. It will be appreciated that, since both edges of the tip 54 ride upon the film 18, the stripping surface 60 intersects a tangent with the film 18 at the point of contact of the leading edge 56 at the preselected angle. As the reel 16 rotates in a clockwise direction, the end of the leader 19 rides along the surface 60 and passes through the opening 20 in the projector for threading by automatic means not shown.

Figure 3:
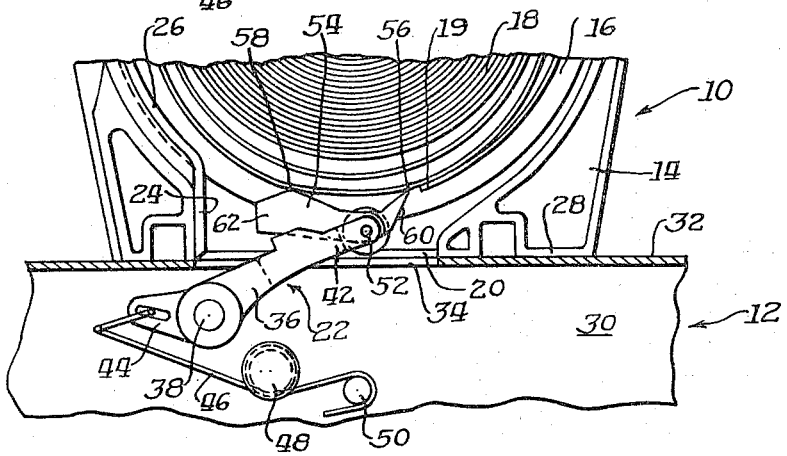
FIG. 3 is a plan view of the apparatus of FIG. 1 in an alternate operational mode.

For illustrational purposes, it will be assumed that the outer convolutions of the film 18 have clocksprung so that they do not form a circle but rather an oval as illustrated in FIG. 3. In this position, the leading edge 56 and the trailing edge 58 of the stripper tip 54 are brought to rest upon the film 18. It will be noted that the stripper tip 54 is caused to rock so that the surface 60 intersects a tangent with the film 18 at the contact point of the leading edge 56 at the preselected angle. This particular rocking feature assures that the plane of the stripper surface 60 intersects the film 18 at an angle which assures proper stripping of the leader 19 from the film 18 regardless of the shape of the outer film convolution.

For purposes of discussion it will be assumed that the end of the leader 19 has a reversed curl as illustrated in FIG. 1. Further, that the leader 19, upon placement of the film 18 on cartridge 14 upon the projector 12, is at a point between the leading 56 and the trailing 58 edges of the stripper tip 54. In this situation, the end of the leader 19 must make a complete revolution about the cartridge 14 before it will engage the leading edge 56 of the stripper tip 54. As the reel 16 is rotated in a clockwise direction, the end of the leader 19 will pass the trailing edge of the stripper tip 54. The reverse curl on the leader 19 would, without the presence of the deflection member 62, force the end downwardly until it abuts the vertical wall 24. The leader 19 would thereafter pass along the vertical wall 24 of the cartridge 14 and thus jam preventing further rotation of the film reel 16. However, the deflection member 62 serves to deflect the end of the leader 19 toward the center of the reel 16 so as to assure clearance of the vertical wall 24 after which the leader 19 will pass along the curved portion 26 of the inner wall until it completes one revolution engaging the leading edge 56 of the stripper tip 54. The illustrated stripper assembly 22 serves to assure proper stripping of the leader 19 from the film 18 both in its tightly wound and clocksprung conditions.

While this invention has been particularly shown and described in connection with a preferred embodiment, it will be understood that various changes in the form and detail may be made without departing from the spirit and scope of the invention as set forth in the following claims.

What is claimed is:

1. An apparatus for stripping the end of the leader from a coil of flexible web material comprising:
    an elongated member pivotally supported at one end;
    means biasing the free end of said member toward said coiled material;
    a stripper tip pivotally supported to the free end of said elongated member and defining a surface, said stripper tip having a leading edge maintained in contact with the coiled material and a trailing edge spaced from said leading edge and maintained in contact with the coiled material;
    and means for maintaining a predetermined angle between said surface and a tangent to the material at the point of contact with the tip irrespective of the shape of the outer convolution of the material.

2. The apparatus of claim 1 wherein said stripper tip is generally crescent shaped one end defining said leading edge and the remaining end defining said trailing edge and means pivotally mounting said crescent shaped tip intermediate the ends thereof to the free end of said elongated member.

3. The apparatus of claim 2 wherein said support member defines means limiting the pivotal movement of said stripper tip to assure contact of both said leading edge and said trailing edge with the coiled web material.

4. The apparatus of claim 3 wherein the free end of said support member is bifurcated defining parallel prongs, said stripper tip being pivotally supported between said prongs.

5. The apparatus of claim 2 wherein said stripper tip further includes means for preventing the undesired passage of film about said tip adjacent the trailing edge thereof.

6. The apparatus of claim 5 wherein said preventing means comprises an elongated deflection member projecting from said crescent shaped tip adjacent the trailing edge thereof.

7. The apparatus of claim 4 wherein said stripper tip further includes means for preventing the undesired passage of film about said tip adjacent the trailing edge thereof.

8. The apparatus of claim 7 wherein said preventing means comprises an elongated deflection member projecting from said crescent shaped tip adjacent the trailing edge thereof.

9. The apparatus of claim 8 wherein the notch defined by said bifurcated end of said elongated member is of a size which prevents complete rotational movement of said stripper tip and bias means for biasing said deflection member against said elongated member adjacent the defined notch.

10. The apparatus of claim 9 wherein said biasing means is provided by gravitational force the center of gravity of said tip being between said deflection member and the pivot of said tip with respect to said elongated member.

* * * * *